United States Patent
Chen et al.

(10) Patent No.: US 11,088,557 B2
(45) Date of Patent: *Aug. 10, 2021

(54) MOTHERBOARD WITH A CHARGING FUNCTION

(71) Applicant: GIGA-BYTE TECHNOLOGY CO., LTD., New Taipei (TW)

(72) Inventors: Yuan-Chieh Chen, New Taipei (TW); Chin-Hui Chen, New Taipei (TW); Cheng-Hua Tsai, New Taipei (TW); Ko-Hui Lin, New Taipei (TW)

(73) Assignee: GIGA-BYTE TECHNOLOGY CO., LTD., New Taipei (TW)

( * ) Notice: Subject to any disclaimer, the term of this patent is extended or adjusted under 35 U.S.C. 154(b) by 164 days.

This patent is subject to a terminal disclaimer.

(21) Appl. No.: 16/291,510

(22) Filed: Mar. 4, 2019

(65) Prior Publication Data
US 2020/0052495 A1 Feb. 13, 2020

(30) Foreign Application Priority Data
Aug. 7, 2018 (TW) ................................. 107127423

(51) Int. Cl.
*H02J 7/00* (2006.01)
*G06F 1/28* (2006.01)

(52) U.S. Cl.
CPC ................ *H02J 7/007* (2013.01); *G06F 1/28* (2013.01)

(58) Field of Classification Search
CPC ...................................................... H02J 7/007
(Continued)

(56) References Cited

U.S. PATENT DOCUMENTS

| 2010/0301812 A1* | 12/2010 | Aiura | H02J 7/008 320/160 |
| 2011/0279093 A1* | 11/2011 | Lin | H02J 7/00 320/162 |

(Continued)

FOREIGN PATENT DOCUMENTS

| CN | 103365388 A | 10/2013 |
| CN | 206077012 U | 4/2017 |

(Continued)

OTHER PUBLICATIONS

Taiwanese Office Action and Search Report dated Jun. 12, 2019 for Application No. 107127423.

(Continued)

*Primary Examiner* — Jerry D Robbins
(74) *Attorney, Agent, or Firm* — Birch, Stewart, Kolasch & Birch, LLP

(57) ABSTRACT

A motherboard having a charging function is provided. A connection interface is configured to an electrical device. A first controller communicates with the electrical device via a first transmission path. A second controller communicates with the electrical device via a second transmission path. In a first mode, the first controller directs a voltage converter circuit to generate first charge power to the electrical device. In a second mode, the second controller directs the voltage converter circuit to generate second charge power to the electrical device. In a third mode, the first controller determines whether the electrical device is a specific device. Responsive to the electrical device not being the specific device, the voltage converter circuit generates third charge power to the electrical device. Responsive to the electrical device being the specific device, the voltage converter circuit generates fourth charge power to the electrical device.

10 Claims, 6 Drawing Sheets

(58) Field of Classification Search
USPC .......................................................... 320/107
See application file for complete search history.

(56) References Cited

U.S. PATENT DOCUMENTS

| | | | |
|---|---|---|---|
| 2012/0043818 A1 | 2/2012 | Stratakos et al. | |
| 2016/0105038 A1* | 4/2016 | Chi | H02J 7/00036 320/107 |
| 2016/0352130 A1* | 12/2016 | Zhang | H02J 7/0072 |
| 2018/0191186 A1* | 7/2018 | Zhang | H02J 7/0072 |

FOREIGN PATENT DOCUMENTS

| | | |
|---|---|---|
| CN | 104578321 B | 6/2017 |
| CN | 107437833 A | 12/2017 |
| JP | 2013-191913 A | 9/2013 |
| TW | 201138262 A1 | 11/2011 |
| TW | 201141003 A1 | 11/2011 |
| TW | M435096 U1 | 8/2012 |
| TW | 201322589 A1 | 6/2013 |
| TW | 201335764 A1 | 9/2013 |
| TW | 201535930 A | 9/2015 |
| TW | I627814 B | 6/2018 |

OTHER PUBLICATIONS

Extended European Search Report for European Application No. 19166682.5. dated Oct. 31, 2019.
Taiwanese Office Action and Search Report for Taiwanese Application No. 107127424, dated Jan. 7, 2019.

* cited by examiner

US 11,088,557 B2

MOTHERBOARD WITH A CHARGING FUNCTION

CROSS REFERENCE TO RELATED APPLICATIONS

This Application claims priority of Taiwan Patent Application No. 107127423, filed on Aug. 7, 2018, the entirety of which is incorporated by reference herein.

BACKGROUND OF THE INVENTION

Field of the Invention

The invention relates to a motherboard, and more particularly to a motherboard having a charging function.

Description of the Related Art

With technological development, the functions and types of electronic devices have increased. Generally, chargers (or charging lines) for different electronic devices are not compatible. For example, different electronic devices cannot share the same charging line. Therefore, a user needs to have many chargers and charging lines. When the user goes out, it is necessary to bring many chargers and the corresponding charging lines, thus increasing inconvenience.

BRIEF SUMMARY OF THE INVENTION

In accordance with an embodiment, a motherboard has a charging function and comprises a connection interface, a switching circuit, a first controller, a second controller, and a voltage converter circuit. The connection interface is configured to an electrical device. The switching circuit is coupled to the connection interface and comprises a first transmission path and a second transmission path. The first controller is coupled to the switching circuit and communicates with the electrical device via the first transmission path. The second controller is coupled to the switching circuit and communicates with the electrical device via the second transmission path. The voltage converter circuit is coupled to the connection interface, the first controller and the second controller. In a standard charge mode, the first transmission path is turned on and the first controller directs the voltage converter circuit to generate first charge power to the electrical device. In a first fast charge mode, the second transmission path is turned on and the second controller directs the voltage converter circuit to generate second charge power to the electrical device. In a second fast charge mode, the first transmission path is turned on and the first controller determines whether the electrical device is a specific device. Responsive to the electrical device not being the specific device, the first controller directs the voltage converter circuit to generate third charge power to the electrical device. Responsive to the electrical device being the specific device, the first controller directs the voltage converter circuit to generate fourth charge power to the electrical device.

BRIEF DESCRIPTION OF THE DRAWINGS

The invention can be more fully understood by referring to the following detailed description and examples with references made to the accompanying drawings, wherein.

DETAILED DESCRIPTION OF THE INVENTION

Figure 1:
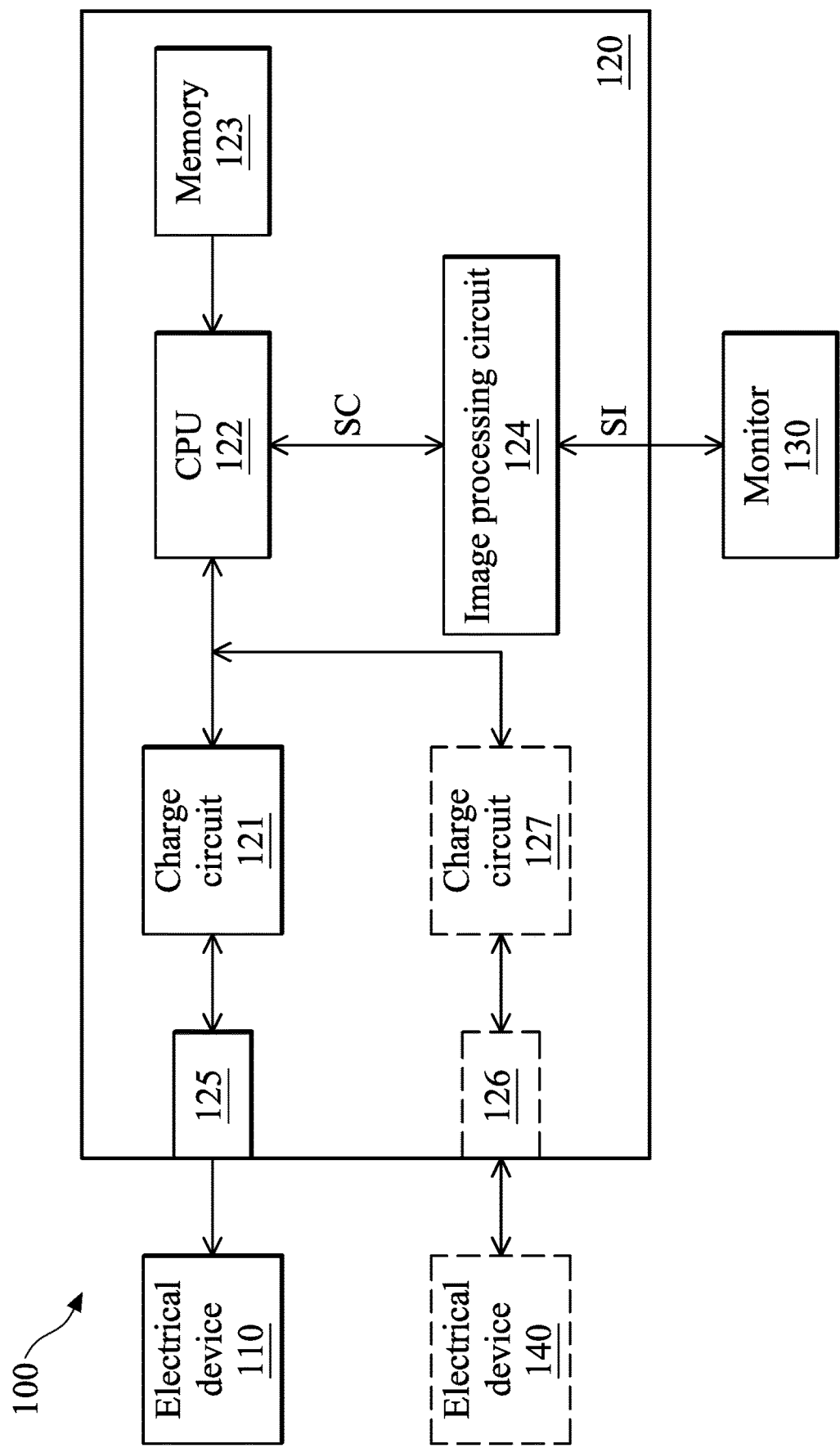
FIG. 1 is a schematic diagram of an exemplary embodiment of an operation system, according to various aspects of the present disclosure.

The present invention will be described with respect to particular embodiments and with reference to certain drawings, but the invention is not limited thereto and is only limited by the claims. The drawings described are only schematic and are non-limiting. In the drawings, the size of some of the elements may be exaggerated for illustrative purposes and not drawn to scale. The dimensions and the relative dimensions do not correspond to actual dimensions in the practice of the invention.

FIG. 1 is a schematic diagram of an exemplary embodiment of an operation system, according to various aspects of the present disclosure. The operation system 100 comprises an electrical device 110, a motherboard 120 and a monitor 130. In this embodiment, when the electrical device 110 is coupled to the motherboard 120, the motherboard 120 outputs an image signal SI. The monitor 130 displays a charge menu according to the image signal SI for user to choose. When a user chooses a charging option on the charge menu, the motherboard 120 outputs a corresponding charge power to charge the electrical device 110. The kind of electrical device 110 is not limited in the present disclosure. In one embodiment, the electrical device 110 is a mobile electrical device, such as a smart phone or a flat plate.

The motherboard 120 at least comprises a charge circuit 121, a central processing unit (CPU) 122, a memory 123, an image processing circuit 124 and a connection interface 125. In one embodiment, when the electrical device 110 is coupled to the connection interface 125, the charge circuit 121 notifies the CPU 122. The CPU 122 performs a charge program code stored in the memory 123 to generate a control signal SC. The image processing circuit 124 generates an image signal SI according to the control signal SC. The monitor 130 displays a charge menu according to the image signal SI.

The charge menu displayed on the monitor 130 includes many charging options. A user chooses the appropriate charging option according to the brand of the electrical device 110. The CPU 122 directs the charge circuit 121 to output appropriate charge power according to the chosen charging option. Since the charge circuit 121 supports many charge protocols, the user only utilizes a connection line coupled between the electrical device 110 and the motherboard 120 to fast charge the electrical device 110. Therefore, the user does not need to buy additional specific charger.

Furthermore, even if the motherboard 120 operates in a power saving mode, such as a S3 mode (suspend to RAM) or a S4 mode (suspend to Disk) defined by an advanced configuration and power interface (ACPI) specification, the charge circuit 121 is capable of charging the electrical device 110 continually. Additionally, with the charge menu displayed on the monitor 130, the user is capable of choosing an appropriate charging option. The user is also capable of controlling the charge time to avoid overcharging the battery disposed in the electronic device. The charge menus displayed on the monitor 130 will be described in greater detail with reference FIGS. 2A and 3A.

The invention does not limit the number of charge circuits or the number of connection interfaces. In other embodiments, the motherboard 120 further comprises a connection interface 126 and a charge circuit 127. When the electrical device 140 is coupled to the connection interface 126, the monitor 130 displays a charge menu including various charging options to be chosen by a user. The charge circuit 127 outputs charge power to the electrical device 140 according to the chosen charging option. In one embodiment, the charge power output from the charge circuit 121 may be the same as or different from the charge power output from the charge circuit 127.

The invention does not limit the kind of monitor 130. In one embodiment, the monitor 130 may be a touch screen. In this case, a user is capable of utilizing his finger to choose the charge options displayed on the monitor 130. In other embodiments, the user may utilize other input device (e.g. a keyboard or a mouse) to indirectly choose the charging option displayed on the monitor 130.

In one embodiment, the motherboard 120 and the monitor 130 are integrated into a single electrical device, such as a laptop computer. In other embodiments, the motherboard 120 is disposed in a case and connected to the monitor 130 via a transmission line. The kind of transmission line is not limited in the present disclosure. In one embodiment, the transmission line between the motherboard 120 and the monitor 130 is a video graphics array (VGA) transmission line, a digital visual interface (DVI) transmission line, or a high definition multimedia interface (HDMI) transmission line.

Figure 2A:
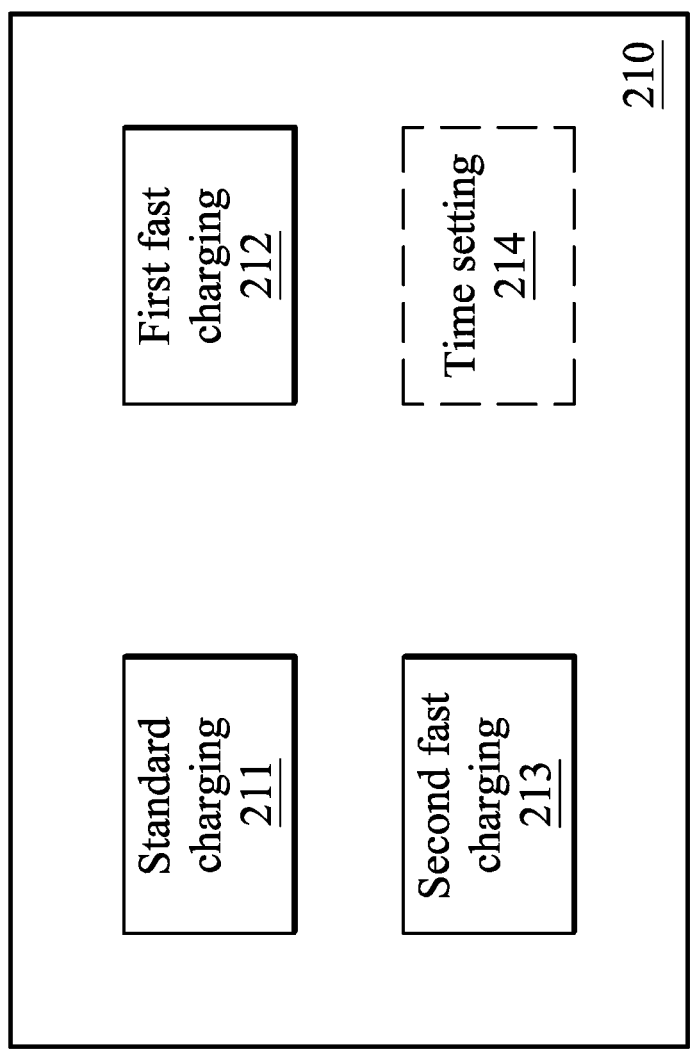
FIG. 2A is an illustration of an exemplary embodiment of a menu displayed on a monitor according to various aspects of the present disclosure.
Figure 2B:
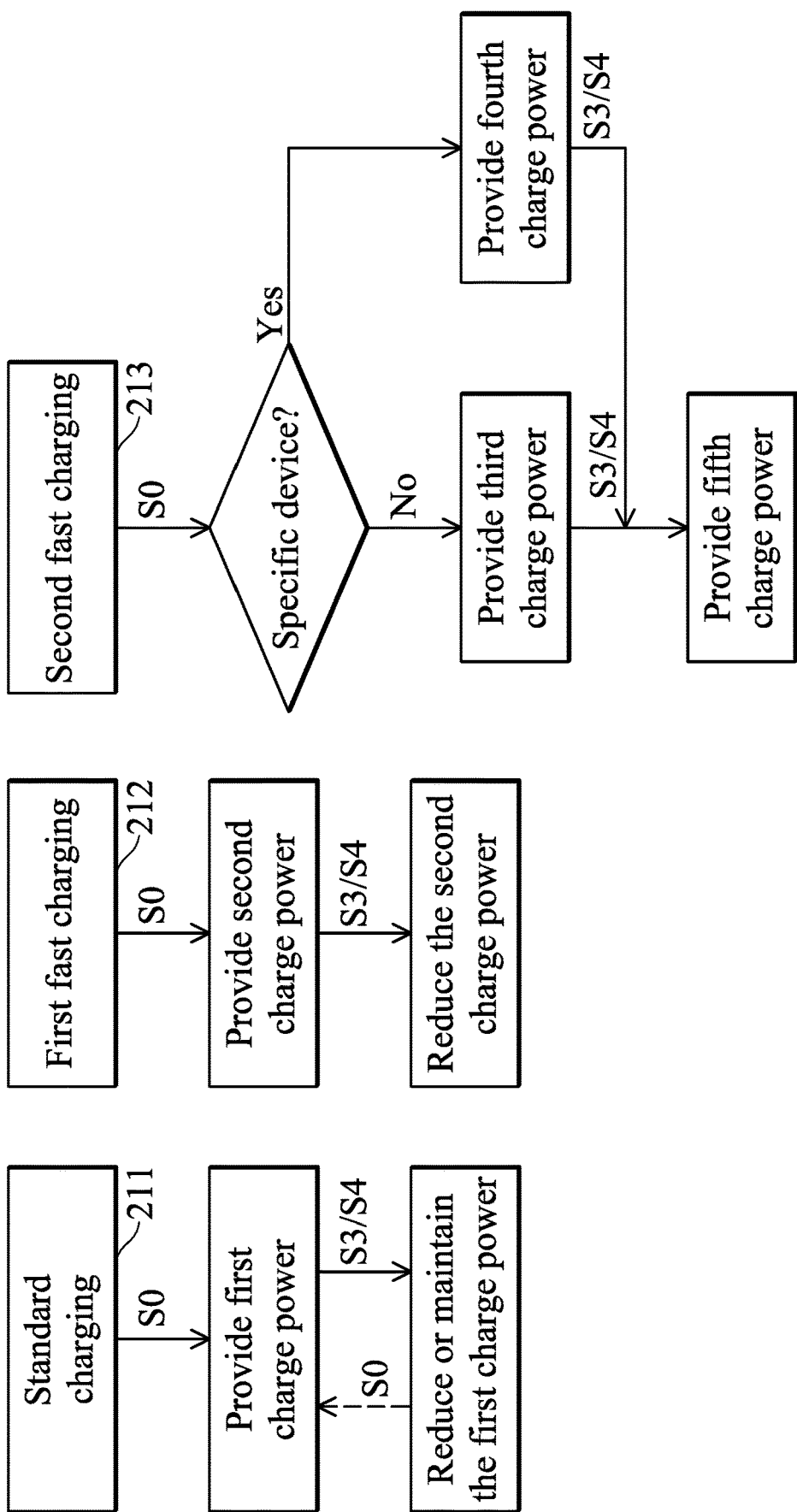
FIG. 2B is an operation chart of an exemplary embodiment of FIG. 2A according to various aspects of the present disclosure.

FIG. 2A is an illustration of an exemplary embodiment of a charge menu displayed on the monitor 130 according to various aspects of the present disclosure. As shown in FIG. 2A, the charge menu 210 has a standard charging option 211, a first fast charging option 212 and a second fast charging option 213. FIG. 2B is an operation chart of an exemplary embodiment of FIG. 2A according to various aspects of the present disclosure. When the standard charging option 211 is chosen by the user, a controller (e.g. the CPU 122) of the motherboard 120 directs the charge circuit 121 to provide first charge power to the electrical device 110. In this embodiment, the first charge power meets the USB implementers forum (USB-IF) specification. For example, the power of the first charge power may be about 2.5 W. At this time, all elements of the motherboard 120 operate in a normal mode, such as the S0 mode defined in the ACPI specification.

However, when a specific element (e.g., the CPU 122) disposed on the motherboard 120 exits a normal mode and enters a power saving mode (e.g., the S3 mode or the S4 mode defined in the ACPI specification), the charge circuit 121 may or may not adjust the first charge power. In one embodiment, the charge circuit 121 may maintain or reduce the first charge power or stop providing the first charge power. In another embodiment, the charge circuit 121 may output a wake-up signal according to a signal generated by the electronic device 110. Any element operating in the power saving mode is woken up according to the wake-up signal. In other embodiments, the charge circuit 121 does not output any wake-up signal. Therefore, the electronic device 110 cannot utilize the charge circuit 121 to wake the specific element entering the power saving mode.

When the user chooses the first fast charging option 212, the motherboard 120 directs the charge circuit 121 to provide second charge power to the electronic device 110. In one embodiment, the charge circuit 121 provides the second charge power according to a quick charge (QC) 2.0 protocol or a QC 3.0 protocol. Take the QC 3.0 as an example, when the electronic device 110 receives the second charge power, the state of charge (SOC) of the battery in the electronic device 110 is increased from 0% to 80% after 35 minutes. In this embodiment, the second charge power is higher than the first charge power. For example, the power of the second charge power is about 18 W. At this time, the motherboard 120 operates in a normal mode. In some embodiments, when a specific element of the motherboard 120 enters a power saving mode, the charge circuit 121 may reduce the second charge power (e.g., from 18 W to 5 W). In other embodiments, when the user chooses the first fast charging option 212, the electronic device 110 cannot utilize the charge circuit 121 to wake the specific element operating in the power saving mode.

When the user chooses the second fast charging option 213, the charge circuit 121 determines whether the electronic device 110 is a specific device, such as an iPhone 8, an iPhone X or an iPad Pro produced by Apple Inc. When the electronic device 110 is not an iPhone 8, an iPhone X or an iPad Pro, the charge circuit 121 provides third charge power to the electronic device 110. When the electronic device 110 is an iPhone 8, an iPhone X or an iPad Pro, the charge circuit 121 provides fourth charge power to the electronic device 110. In one embodiment, the fourth charge power is greater than the third charge power. For example, the third charge power is about 12 W and the fourth charge power is about 15 W. In some embodiments, when the electronic device 110 receives the third or fourth charge power, the SOC of the battery in the electronic device 110 reaches 50%.

In other embodiments, when a specific element of the motherboard 120 operates in a power saving mode, the charge circuit 121 provides fifth charge power to the electronic device 110. In this embodiment, the fifth charge power is less than the third charge power and the fourth charge power. In one embodiment, the fifth charge power is approximately 5 W. At this time, the electronic device 110 cannot utilize the charge circuit 121 to wake the specific element operating in the power saving mode.

In other embodiments, the charge menu 210 further comprises a time setting option 214 shown in FIG. 2A. When the user chooses the time setting option 214 and inputs charging time, the charge circuit 121 provides charge power to the electronic device 110 according to the charging time. For example, assume that the charging time provided by user is one hour. In this case, when the duration of the charge circuit 121 providing the charge power reaches one hour, the charge circuit 121 stops providing the charge power to avoid overcharging the battery disposed in the electronic device 110.

In one embodiment, the user may choose one of the standard charging option 211, the first fast charging option 212 and the second fast charging option 213 and then choose the time setting option 214 to limit the duration of the charge time. In another embodiment, the user may choose the timing setting option 214 and then choose one of the standard charging option 211, the first fast charging option 212 and the second fast charging option 213. In another embodiment, the user may only choose one of the standard charging option 211, the first fast charging option 212 and the second fast charging option 213 and may not choose the time setting option 214.

In other embodiments, the motherboard 120 may comprise a plurality of connection interfaces and a plurality of charge circuits. In this case, each connection interface is coupled to a charge circuit. Each time an electronic device is coupled to a connection interface, the monitor 130 displays a corresponding charge menu. For example, when a first electronic device is coupled to a first connection interface, the monitor 130 displays a first charge menu so that the user can choose the appropriate charging option for the first electronic device. When a second electronic device inserts a second connection interface, the monitor 130 displays a second charge menu so that the user can choose the appropriate charging option for the second electronic device. The first charge menu may be the same as or different from the second charge menu. In one embodiment, the user may select a first fast charging option of the first charge menu and select a second first fast charging option of the second charge menu. Therefore, the charge power provided to the first electronic device is different from the charge power provided to the second electronic device.

Figure 3A:
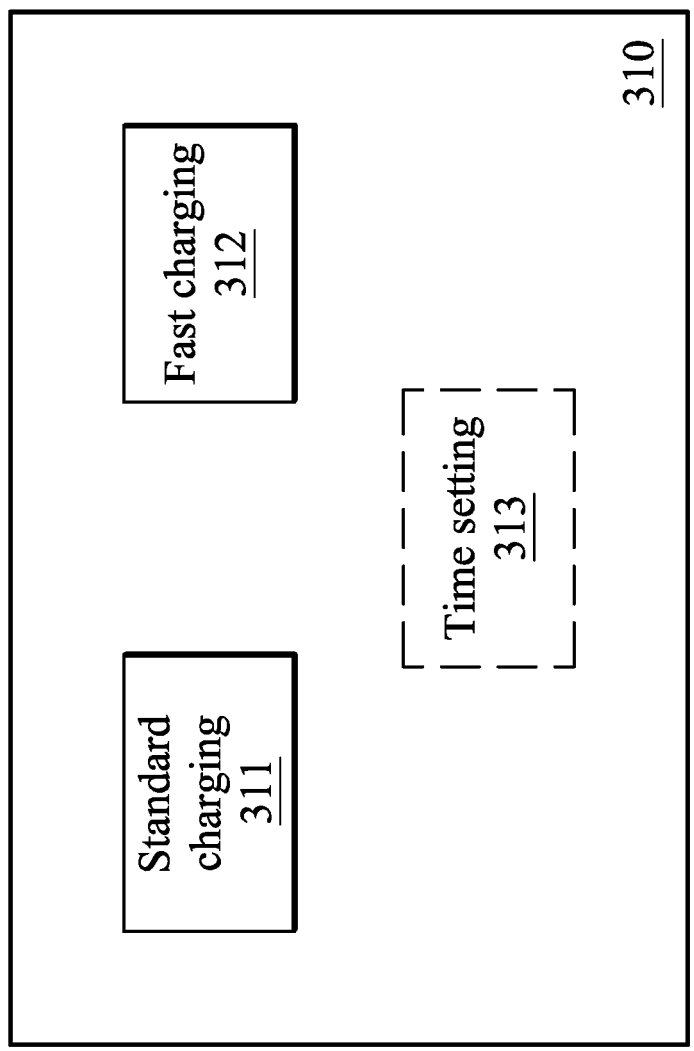
FIG. 3A is an illustration of another exemplary embodiment of a menu displayed on a monitor according to various aspects of the present disclosure.
Figure 3B:
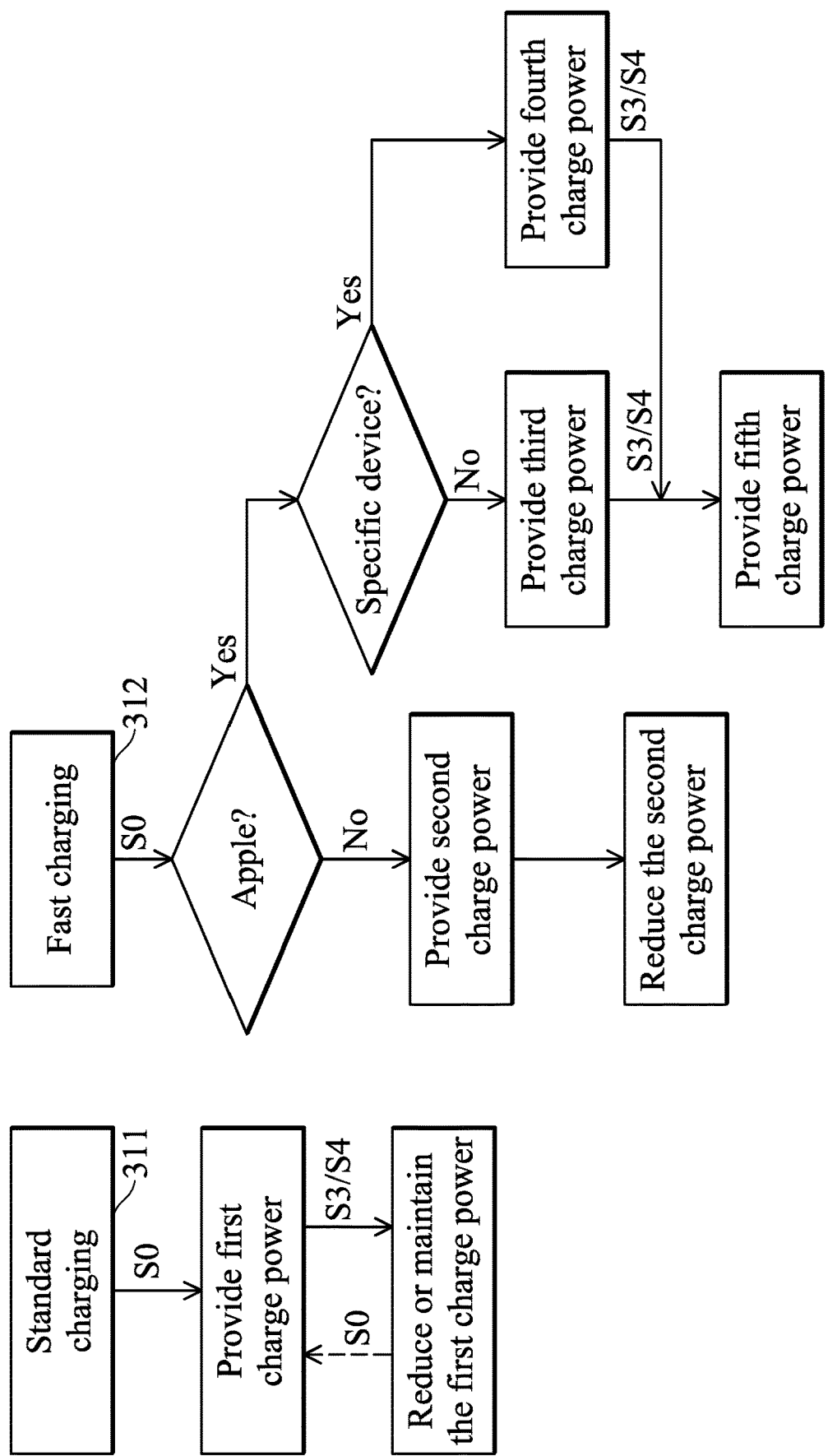
FIG. 3B is an operation chart of an exemplary embodiment of FIG. 3A according to various aspects of the present disclosure.

FIG. 3A is an illustration of another exemplary embodiment of a menu displayed on a monitor according to various aspects of the present disclosure. The charge menu 310 comprises a standard charging option 311 and a fast charging option 312. FIG. 3B is an operation chart of an exemplary embodiment of FIG. 3A according to various aspects of the present disclosure. When the user selects the standard charging option 311, the charge circuit 121 provides first charge power to the electronic device 110. At this time, when a specific element of the motherboard 120 enters a power saving mode, the charge circuit 121 may maintain or reduce the first charge power. In other embodiments, the charge circuit 121 may stop providing the first charge power. In one embodiment, the charge circuit 121 generates a wake-up signal according to at least one signal generated by the electronic device 110 to wake the specific element operating in the power saving mode. In another embodiment, the charge circuit 121 does not generate the wake-up signal.

When the user selects the fast charging option 312, the charge circuit 121 determines whether the electronic device 110 is a product of Apple Inc. In one embodiment, the charge circuit 121 determines whether the electronic device 110 is a product of Apple Inc. according to the operating system of the electronic device 110. For example, when the electronic device 110 does not have an IOS operating system, it means that the electronic device 110 is not one produced by Apple Inc. Therefore, the charge circuit 121 provides a second charge power to the electronic device 110. The second charge power is greater than the first charge power. At this time, when a specific element of the motherboard 120 enters a power saving mode, the charge circuit 121 may reduce the second charge power. At this time, the charge circuit 121 does not generate the wake-up signal.

When the electronic device 110 has the IOS operating system, it means that the electronic device 110 is produced by Apple Inc. Therefore, the charge circuit 121 determines whether the electronic device 110 is a specific device, such as an iPhone 8, an iPhone X or an iPad Pro. When the electronic device 110 is not the specific device, the charge circuit 121 provides third charge power to the electronic device 110. When the electronic device 110 is the specific device, the charge circuit 121 provides fourth charge power to the electronic device 110.

At this time, when a specific element (e.g., the element 122, 123 or 124 shown in FIG. 1) of the motherboard 120 enters a power saving mode, the charge circuit 121 may provide fifth charge power to the electronic device 110. The fifth charge power is greater than the first charge power but less than each of the third charge power and the fourth charge power. In one embodiment, when the charge circuit 121 provides the fifth charge power to the electronic device 110, the charge circuit 121 does not generate a wake-up signal.

In other embodiments, the charge circuit 121 determines whether the electronic device 110 is produced by Apple Inc. according to the vendor ID of the electronic device 110. In one embodiment, the vendor ID has a plurality of bits. The charge circuit 121 determines whether the electronic device 110 is a product produced by Apple Inc. according to at least one bit of the vendor ID. In this case, the charge circuit 121 determines that the type (e.g., the iPhone 8, the iPhone X or the iPad Pro) of the electronic device 110 according to one or more bits of the vendor ID.

In other embodiments, the charge menu 310 further has a time setting option 313 to limit the charging time of the electronic device 110. Since the feature of the time setting option 313 is the same as the feature of the time setting option 214 of FIG. 2A, the description of the feature of the time setting option 313 is omitted.

Figure 4:
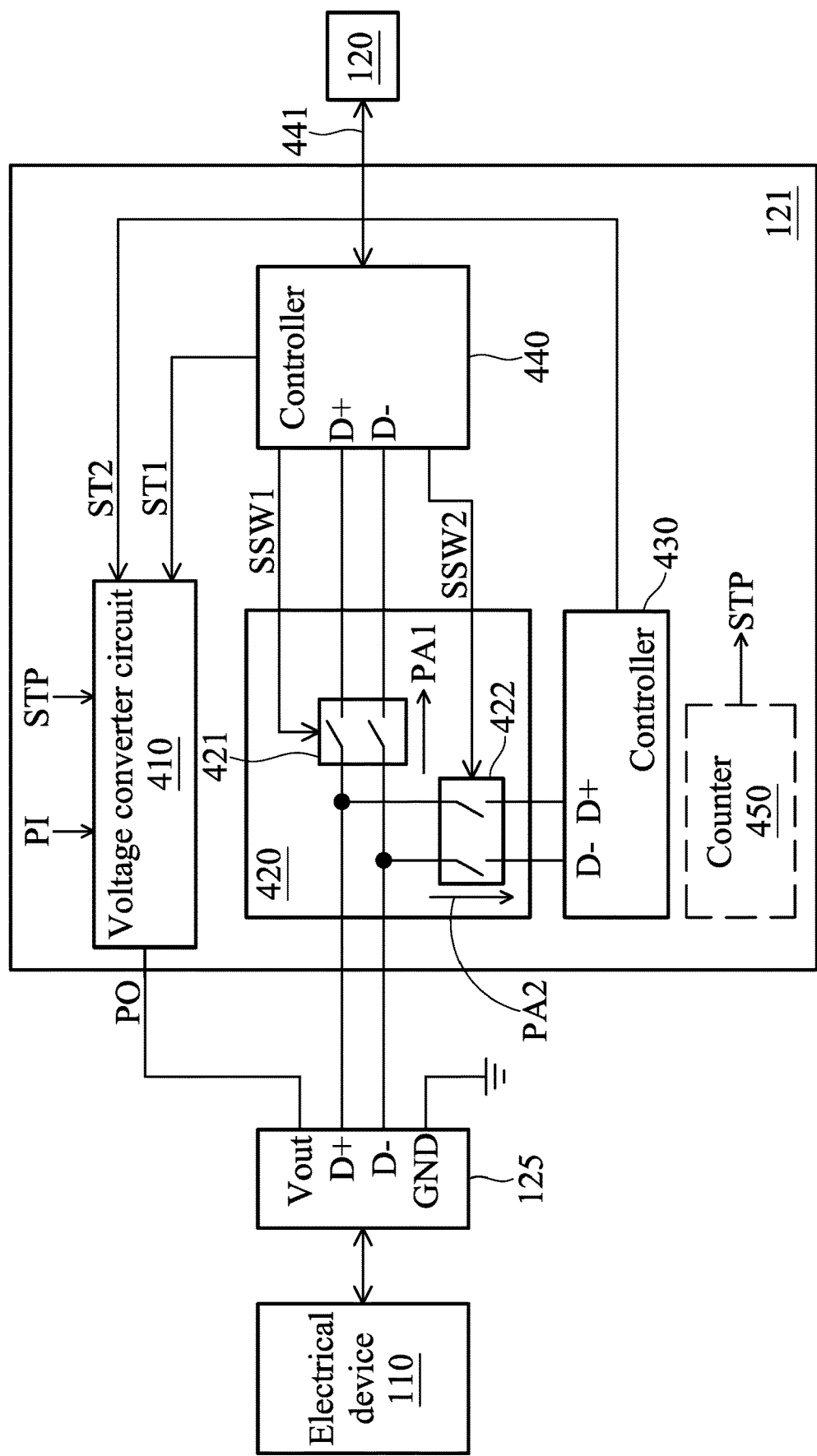
FIG. 4 is a schematic diagram of an exemplary embodiment of a charge circuit, according to various aspects of the present disclosure.

FIG. 4 is a schematic diagram of an exemplary embodiment of a charge circuit, according to various aspects of the present disclosure. As shown in FIG. 4, the charge circuit 121 comprises a voltage converter circuit 410, a switching circuit 420 and controllers 430 and 440. In this embodiment, the charge circuit 121 communicates with the electronic device 110 via the connection interface 125 and outputs the appropriate charge power according to the charging option chosen by the user.

The kind of connection interface 125 is not limited in the present disclosure. In one embodiment, the connection interface 125 is a USB 2.0 connection port or a USB 3.1 connection port. In this embodiment, the connection interface 125 has pins Vout, D+, D− and GND. The pins Vout and GND are configured to transmit charge power to the electronic device 110. The pins D+ and D− are configured to transmit data. In one embodiment, the charge circuit 121 communicates with the electronic device 110 via the pins D+ and D−.

The voltage converter circuit 410 is coupled to the connection interface 125 to output the charge power PO. The voltage converter circuit 410 is further coupled to the controllers 430 and 440 to receive trigger signals ST1 and ST2. In this embodiment, the voltage converter circuit 410 converts input power PI to generate the charge power PO according to the trigger signal ST1 or ST2. In one embodiment, the voltage converter circuit 410 converts the voltage level or the current of the input power PI to generate a converted result and serves the converted result as the charge power PO. In other embodiments, the input power PI is provided by a power supply (not shown). In some embodiments, the voltage converter circuit 410 stops outputting the charge power PO according to a disable signal STP.

The switching circuit 420 is coupled to the connection interface 125 and transmits the signals on the pins D+ and D− to the controller 430 or 440 according to switching signals SSW1 and SSW2. In this embodiment, when the switching circuit 420 transmits the signals on the pins D+ and D− to the controller 430, the switching circuit 420 does not transmit the signals on the pins D+ and D− to the controller 440. When the switching circuit 420 transmits the signals on the pins D+ and D− to the controller 440, the switching circuit 420 does not transmit the signals on the pins D+ and D− to the controller 430.

The disclosure does not limit the circuit structure of switching circuit 420. In one embodiment, the switching circuit 420 comprises switches 421 and 422. The switch 421 turns the transmission path PA1 on and off according to the switching signal SSW1. The transmission path PA1 is coupled between the pins D+ and D− of the connection interface 125 and the controller 440. The switch 422 turns the transmission path PA2 on and off according to the switching signal SSW2. The transmission path PA2 is coupled between the pins D+ and D− of the connection interface 125 and the controller 430.

The controller 430 is coupled between the switching circuit 420 and the voltage converter circuit 410. In this embodiment, the controller 430 communicates with the electronic device 110 via the transmission path PA2 and generates the trigger signal ST2 according to the charging requirements of the electronic device 110. The disclosure does not limit the circuit structure of controller 430. In one embodiment, the controller 430 is an identification charging integrated circuit (IC). In other embodiments, the controller 430 does not supply a wake-up function. Therefore, the controller 430 cannot generate a wake-up signal according to the signal generated by the electronic device 110.

The controller 440 is coupled between the switching circuit 420 and the voltage converter circuit 410. In this embodiment, the controller 440 communicates with the electronic device 110 via the transmission path PA1 and generates the trigger signal ST1 according to the charging requirements of the electronic device 110. The disclosure does not limit the circuit structure of controller 440. In one embodiment, the controller 440 is a platform controller hub (PCH). In another embodiment, the controller 440 supplies a wake-up function. In this case, the controller 440 can generate a wake-up signal according to the signal generated by the electronic device 110 to wake the specific elements of the motherboard 120 operating a power saving mode. In other embodiments, the controller 440 does not supply a wake-up function.

In some embodiments, the controller 440 may communicate with some elements of the motherboard 120 via at least one transmission line 441. In one embodiment, the controller 440 identifies the charging option selected by the user according to the signal of the transmission line 441 and generates the corresponding switching signals SSW1 and SSW2 according to the selected charging option. In another embodiment, the switching signals SSW1 and SSW2 are provided by other element (e.g., a CPU) of the motherboard 120.

When the user chooses the standard charging option 211 of FIG. 2A or the standard charging option 311 of FIG. 3A, the charge circuit 121 enters a standard charge mode. In this mode, the controller 440 turns on the transmission path PA1 and turns off the transmission path PA2 according to the switching signals SSW1 and SSW2. In one embodiment, the controller 440 does not communicate with the electronic device 110. In this case, the controller 440 directly controls the voltage converter circuit 410 to generate charge power PO. At this time, the charge power PO is referred to as first charge power. In this mode, even if the operating system of the electronic device 110 is the IOS system or the Android system, the charge circuit 121 provides the first charge power to charge the electronic device 110.

Furthermore, in the standard charge mode, when the controller 440 determines that the specific element of the motherboard 120 enters a power saving mode, the controller 440 sends the trigger signal to direct the voltage converter circuit 410 to maintain or reduce the charge power PO. In other embodiments, the voltage converter circuit 410 may stop providing the charge power PO. In some embodiments, when the controller 440 supplies a wake-up function, the electronic device 110 is capable of waking the specific element of the motherboard 120 via the controller 440.

When the user chooses the first fast charging option 212 of FIG. 2A, the charge circuit 121 enters a first fast charge mode. In this mode, the controller 440 turns off the transmission path PA1 and turns on the transmission path PA2. Therefore, the controller 430 communicates with the electronic device 110 via the transmission path PA2 to identify the charge power required by the electronic device 110. Then, the controller 430 generates the trigger signal ST2 to direct the voltage converter circuit 410 to generate the charge power PO. At this time, the charge power PO is referred to as second charge power. In this case, when the controller 430 determines that a specific element of the motherboard 120 enters a power saving mode, the controller 430 sends the trigger signal ST2 to direct the voltage converter circuit 410 to reduce the charge power PO. In one embodiment, the power of the charge power PO is reduced from 18 W to 5 W.

The disclosure does not limit how the controller 430 determines whether the specific element of the motherboard 120 enters the power saving mode. In one embodiment, the controller 430 is coupled to the motherboard 120 via at least one transmission line (not shown) to determine that the specific element of the motherboard 120 has entered the power saving mode. In other embodiments, the controller 430 receives an advice signal from the controller 440 to determine that the specific element of the motherboard 120 enters the power saving mode.

When the user chooses the second fast charging option 213, the charge circuit 121 enters a second fast charge mode. In this mode, the controller 440 turns on the transmission path PA1 and turns off the transmission path PA2. At this time, the controller 440 communicates with the electronic device 110 via the transmission path PA1 to determine whether the electronic device 110 is a specific device.

When the electronic device 110 is not the specific device, the controller 440 sends the trigger signal ST1 to direct the voltage converter circuit 410 to generate the charge power PO. At this time, the charge power PO is referred to as third charge power. When the electronic device 110 is the specific device, the controller 440 directs the voltage converter circuit 410 to generate the charge power PO. At this time, the charge power PO is referred to as fourth charge power.

In the second fast charge mode, when the controller 440 determines that a specific element of the motherboard 120 enters a power saving mode, the controller 440 turns off the transmission path PA1 and turns on the transmission path PA2. At this time, the controller 430 may utilize the transmission path PA2 to inform the electronic device 110 that the charge power will be reduced. Then, the controller 430 sends the trigger signal ST2 to directly the voltage converter circuit 410 to reduce the charge power PO. At this time, the charge power PO is referred to as fifth charge power.

In one embodiment, the fifth charge power is less than each of the third charge power and the fourth charge power. For example, when the electronic device 110 is the specific device, the power of the charge power PO may reduce from 15 W to 5 W. When the electronic device 110 is not the specific device, the power of the charge power PO may reduce from 12 W to 5 W. In other embodiments, the fifth charge power is greater than the first charge power. When the controller 430 does not supply the wake-up function, the electronic device 110 cannot utilize the charge circuit 121 to wake the specific element entering the power saving mode. In one embodiment, the user needs to press a power switch to wake the specific element entering the power saving mode. In this case, when the specific element is waked, the controller 440 turns on the transmission path PA1 and turns off the transmission path PA2 to determine whether the electronic device 110 is a specific device and directs the voltage converter circuit 410 to again output the third or fourth charge power according to the determination result.

In other embodiments, when the user selects the fast charging option 312 of FIG. 3B, the controller 440 turns on the transmission path PA1 to determine whether the electronic device 110 was produced by Apple Inc. When the electronic device 110 is not one produced by Apple Inc., the charge circuit 121 enters a first fast charge mode. In the first fast charge mode, the charge circuit 121 outputs the second charge power. When the electronic device 110 is one produced by Apple Inc., the charge circuit 121 enters a second fast charge mode. In the second fast charge mode, the charge circuit 121 outputs the third or fourth charge power. Since the operation of the charge circuit 121 in the first or second fast charge mode has been described previously, the description of the charge circuit 121 in the first or second fast charge mode is omitted.

In another embodiment, the charge circuit 121 further comprises a counter 450. The counter 450 has a count value. When the user selects the time setting option 214 of FIG. 2B or the time setting option 313 of FIG. 3B, the counter 450 starts to increase or reduce the count value. When the count value is equal to a predetermined value, the counter 450 generates a disable signal STP. The voltage converter circuit 410 stops providing any power to the electronic device 110 according to the disable signal STP. In one embodiment, the predetermined value is related to the charging time input by the user.

Since the charge circuit 121 supplies many charge protocol, the user only utilizes a connection line to connect the electronic device 110 to the motherboard 120 to charge the electronic device 110. The user does not need to buy an additional charger. Additionally, when the charge circuit 121 provides power to the electronic device 110 according to the QC 3.0 protocol, the SOC of the battery in the motherboard 120 is increased from 0% to 80% after 35 minutes. Furthermore, the charge circuit 121 is capable of fast increasing the SOC of the battery in the motherboard 120 to 50% within 30 minutes. In addition, even if the motherboard 120 operates in a power saving mode (e.g., S3 or S4), the charge circuit 121 is capable of continually charging the electronic device 110. Additionally, with the charge menu 210 or 310 displayed on the monitor 130, the user can select the appropriate charging option according to his own needs. Since the charge menu 210 or 310 provides a time setting option to allow the user to control the charging time. Therefore, the disclosure provides double protection for the power management device (e.g., the charge circuit).

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

While the invention has been described by way of example and in terms of the preferred embodiments, it should be understood that the invention is not limited to the disclosed embodiments. On the contrary, it is intended to cover various modifications and similar arrangements (as would be apparent to those skilled in the art). For example, it should be understood that the system, device and method may be realized in software, hardware, firmware, or any combination thereof. Therefore, the scope of the appended claims should be accorded the broadest interpretation so as to encompass all such modifications and similar arrangements.

What is claimed is:

1. A motherboard having a charging function and comprising:
    a connection interface configured to an electrical device;
    a switching circuit coupled to the connection interface and comprising a first transmission path and a second transmission path;
    a first controller coupled to the switching circuit and communicating with the electrical device via the first transmission path;
    a second controller coupled to the switching circuit and communicating with the electrical device via the second transmission path;
    a voltage converter circuit coupled to the connection interface, the first controller and the second controller,
    wherein in a standard charge mode, the first transmission path is turned on and the first controller directs the voltage converter circuit to generate first charge power to the electrical device;
    wherein in a first fast charge mode, the second transmission path is turned on and the second controller directs the voltage converter circuit to generate second charge power to the electrical device;
    wherein in a second fast charge mode, the first transmission path is turned on and the first controller determines whether the electrical device is a specific device, responsive to the electrical device not being the specific device, the first controller directs the voltage converter circuit to generate third charge power to the electrical device, and responsive to the electrical device being the specific device, the first controller directs the voltage converter circuit to generate fourth charge power to the electrical device.

2. The motherboard as claimed in claim 1, wherein the second charge power exceeds each of the first charge power, the third charge power and the fourth charge power, and the fourth charge power exceeds the third charge power.

3. The motherboard as claimed in claim 1, further comprising:
    an image processing circuit configured to generate an image signal to a monitor, wherein the monitor displays a menu according to the image signal,
    wherein responsive to a first option in the menu being chosen, the first transmission path is turned on and the voltage converter circuit generates the first charge power to the electrical device,
    wherein responsive to a second option in the menu being chosen, the second transmission path is turned on and the voltage converter circuit generates the second charge power to the electrical device, wherein responsive to a third option in the menu being chosen, the first transmission path is turned on and the voltage converter circuit generates the third or fourth charge power to the electrical device.

4. The motherboard as claimed in claim 3, further comprising:
a counter having a count value, wherein responsive to the count value being equal to a predetermined value, the voltage converter circuit stops generating any charge power to the electrical device.

5. The motherboard as claimed in claim 4, wherein responsive to a fourth option in the menu being chosen, the counter starts counting.

6. The motherboard as claimed in claim 1, further comprising:
a specific element,
wherein in the first fast charge mode, responsive the specific element entering a power saving mode, the second controller directs the voltage converter circuit to generate fifth charge power to the electrical device, wherein in the second fast charge mode, responsive to the specific element entering the power saving mode, the first transmission path is turned on and the first controller directs the voltage converter circuit to generate the fifth charge power to the electrical device.

7. The motherboard as claimed in claim 6, wherein the fifth charge power is less than the third charge power and the fourth charge power.

8. The motherboard as claimed in claim 7, wherein the fifth charge power exceeds the first charge power.

9. The motherboard as claimed in claim 1, wherein the first controller is a platform controller hub (PCH), and the second controller is an identification charging integrated circuit.

10. The motherboard as claimed in claim 1, wherein the second controller directs the voltage converter circuit to generate the second charge power according to a quick charge technology.

* * * * *